United States Patent [19]

Mori

[11] Patent Number: 4,717,226
[45] Date of Patent: Jan. 5, 1988

[54] PHOTORADIATOR INCLUDING LIGHT CONDUCTING RODS WITH FRUSTO-CONICAL END PORTIONS

[76] Inventor: Kei Mori, 3-16-3-501, Kaminoge, Setagaya-ku, Tokyo, Japan

[21] Appl. No.: 886,865

[22] Filed: Jul. 16, 1986

Related U.S. Application Data

[62] Division of Ser. No. 555,866, Nov. 28, 1983.

[51] Int. Cl.⁴ .................. G02B 6/00; F21V 7/04
[52] U.S. Cl. .................. 350/96.10; 350/96.15; 350/96.29; 362/32
[58] Field of Search .......... 350/96.10, 96.15, 96.16, 350/96.29, 96.30; 362/32; 250/227

[56] References Cited

U.S. PATENT DOCUMENTS

| | | | |
|---|---|---|---|
| 2,909,857 | 10/1959 | Wilson | 350/96.10 |
| 3,439,157 | 4/1969 | Myles | 362/32 |
| 4,084,215 | 7/1978 | Willenbrock | 362/32 |
| 4,141,058 | 2/1979 | Mizohata et al. | 362/32 |
| 4,383,288 | 5/1983 | Hess II et al. | 362/32 |
| 4,422,719 | 12/1983 | Orcutt | 350/96.10 |
| 4,447,118 | 5/1984 | Mulkey | 350/96.10 |
| 4,580,195 | 4/1986 | Mori | 362/32 |
| 4,609,974 | 9/1986 | Mori | 362/32 |
| 4,610,501 | 9/1986 | Mori | 350/96.10 |
| 4,626,065 | 12/1986 | Mori | 350/96.15 |

FOREIGN PATENT DOCUMENTS

| | | | |
|---|---|---|---|
| 1325014 | 3/1963 | France | 362/32 |
| 56-135821 | 10/1981 | Japan | 350/96.10 |

*Primary Examiner*—William L. Sikes
*Assistant Examiner*—Brian M. Healy
*Attorney, Agent, or Firm*—Jordan and Hamburg

[57] ABSTRACT

A photoradiator includes a notch at an axial end or in the periphery thereof in order to radiate light which propagates therethrough. Light is radiated in a desired direction and in a desired quantity at the notch. Even the optical property of the light radiated from the photoradiator may be varied for a desired application.

3 Claims, 29 Drawing Figures

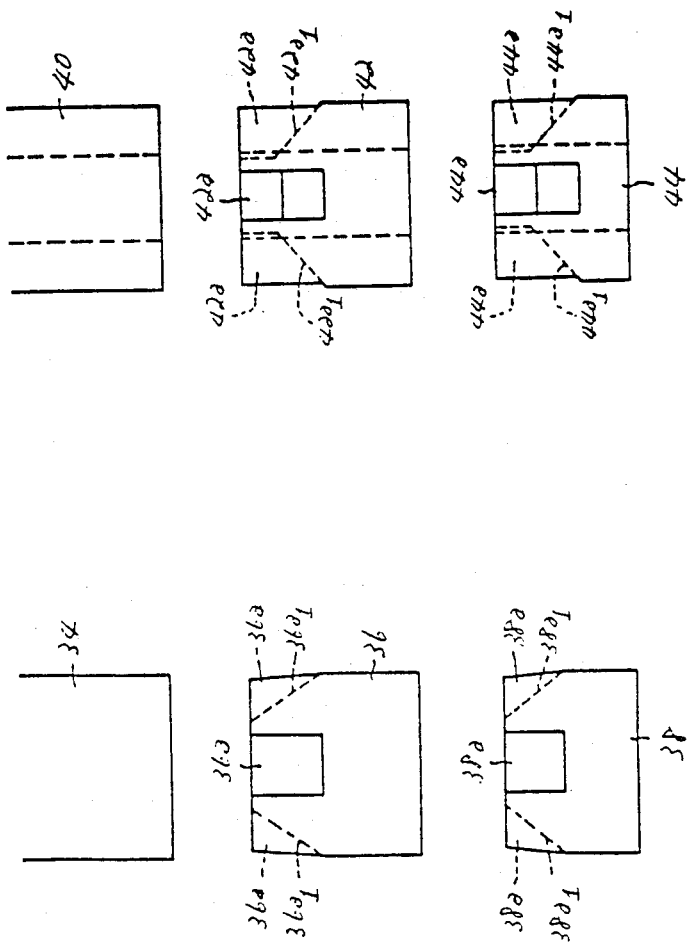

FIG. 15
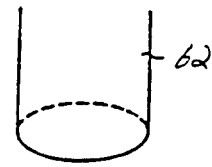
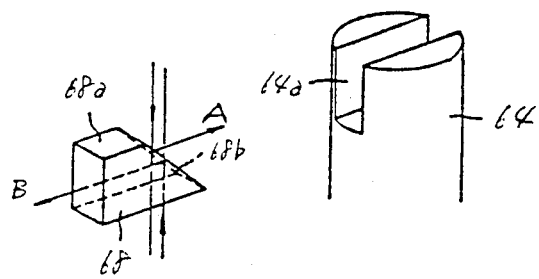
FIG. 16
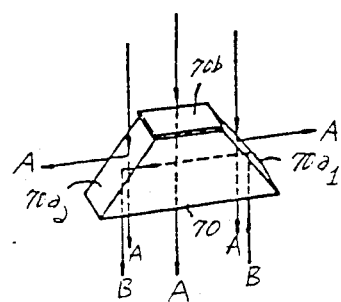
FIG. 17
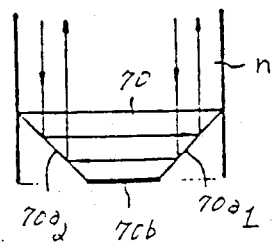

PHOTORADIATOR INCLUDING LIGHT CONDUCTING RODS WITH FRUSTO-CONICAL END PORTIONS

This is a division of application Ser. No. 555,866, filed Nov. 28, 1983.

BACKGROUND OF THE INVENTION

The present invention relates to a photoradiator for effectively radiating light propagating therethrough in a desired direction and in a desired quantity to the ambience, while furnishing it with an optical property suitable for a desired application.

Effective use of solar energy is the key to energy saving today and has been studied in various fields actively. For the most effective use of solar energy, solar energy has to be availed as it is without being transformed into another kind of energy such as thermal energy or electrical energy. In light of this, I have made various proposals for an illumination system which utilizes solar energy. The illumination system employs a light conducting element such as a fiber optic cable through which the sunlight converged by a lens or the like is conducted to a desired location to stream out thereat to illuminate the ambience.

In the illumination system of the type described, the light advancing through the light conductor has directivity. Therefore, if the light is output at a simple cut end of the light conductor, it becomes radiated over an angle $\theta$ which is usually as small as about 46°. The light streaming through the simple cut end of the light conductor would fail to evenly illuminate a desired space such as a room. I have proposed in various forms a photoradiator which is designed to effectively diffuse light conducted by a fiber optic cable to provide even illumination over a wide range.

Another problem encountered with a light conducting element of the kind described is that when it is laid over a length sufficient for practical use, fringes develop in the light emanating from the light conductor which are undesirable for ordinary lighting applications, although some particular applications may rather prefer them. Where the light propagating through the light guide is a laser or the like, fringes appear therein even if the light conductor is of a very small diameter such as an optical fiber, rendering the light unfeasible for use with a laser microscope or the like.

SUMMARY OF THE INVENTION

It is therefore an object of the present invention to provide a photoradiator which is capable of effectively diffusing light transmitted therethrough to the outside by means of a simple construction.

It is another object of the present invention to provide a photoradiator which allows light propagating therethrough to be radiated to the outside in a desired direction and in a desired quantity.

It is another object of the present invention to provide a photoradiator which radiates light having a desired optical property.

It is another object of the present invention to provide a generally improved photoradiator.

In one aspect of the present invention, there is provided a photoradiator comprising a light conducting element which is formed with a notch at one of axially opposite ends thereof, whereby light propagating through the light conducting element is radiated from the one end to the outside.

In another aspect of the present invention, there is provided a photoradiator comprising a light conducting element which is formed with a notch in an outer periphery thereof, whereby light propagating through the light conducting element is radiated from the periphery.

In another aspect of the present invention, there is provided a photoradiator comprising at least two light conducting elements which are connected serially to each other, at least one of the light conducting elements being formed with a notch at one end thereof which connects to the other light conducting element, whereby light propagating through the light conducting elements is radiated at the notch.

In another aspect of the present invention, there is provided a photoradiator comprising a light conducting element which is made up of a cylindrical portion and a frustoconical portion extending tapered from the cylindrical portion.

The above and other objects, features and advantages of the present invention will become apparent from the following detailed detailed description taken with the accompanying drawings.

BRIEF DESCRIPTION OF THE DRAWINGS

FIGS. 1A and 1B to 4A and 4B are views of various embodiments of a photoradiator in accordance with the present invention, suffix "A" indicating a sectional side elevation and suffix "B", a cross-section;

FIGS. 5–9 are views of other embodiments of the present invention;

FIGS. 10–15 are perspective views of other embodiments of the present invention;

FIG. 16 is a perspective view of a modification to a transparent control member included in the photoradiator of FIG. 15;

FIG. 17 is a side elevation of the control member of FIG. 16 which is positioned to reflect incoming light;

FIGS. 20A and 20B to 22A and 22B are views of other embodiments of the present invention.

DESCRIPTION OF THE PREFERRED EMBODIMENTS

While the photoradiator of the present invention is susceptible of numerous physical embodiments, depending upon the environment and requirements of use, substantial numbers of the herein shown and described embodiments have been made, tested and used, and all have performed in an eminently satisfactory manner.

Figure 1A:
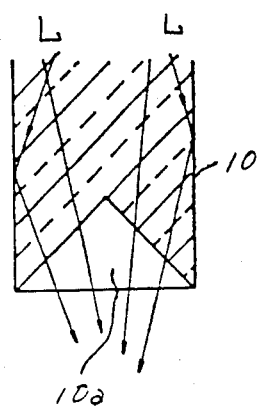
Figure 1B:
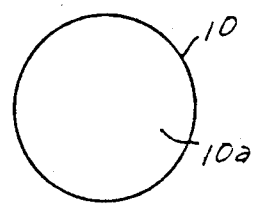

Referring to FIGS. 1A and 1B, a photoradiator embodying the present invention is shown and comprises a light conducting element in the form of a rod 10. The light conductor 10 optically connects at one end thereof (not shown) to a source of converged light supply (not shown). The other end of the light conductor 10 is formed with a single conical notch 10a in order to effectively diffuse light as will be described.

Light such as sunlight L is converged by a lens or the like into the light conductor 10 at the source. The light L propagates through the light conductor 10 while being repeatedly reflected by the rod wall. At the notch 10a in the end of the rod 10, the light L is partly transmitted through the conical surface to the outside and partly reflected thereby to change its course before being radiated. Stated another way, the light L propagating through the rod 10 is diffused to the outside at the conical end 10a over a substantial radiation angle.

Figure 2A:
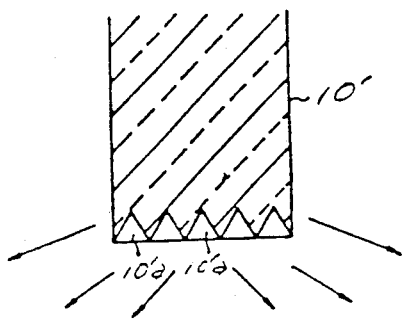
Figure 2B:
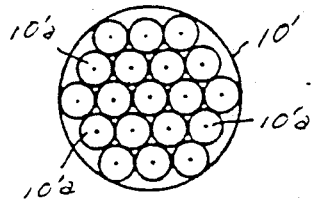

A modification to the structure of FIGS. 1A and and 1B is shown in FIGS. 2A and 2B. As shown, the light conducting element 10' is formed with a number of conical notches 10'a at the light outlet end thereof. The effect attainable with such a multi-notch structure is essentially common to that achieved with the single notch structure.

In both the structures shown in FIGS. 1A and 1B and 2A and 2B, the conical notch configuration is only illustrative and may be replaced by a polygonal pyramid such as triangular pyramid or quadrangular pyramid. If desired, the notched surface or surfaces may be finished for diffusion in order to effectively scatter the light to make the illumination tender to the eyes.

Figure 3A:
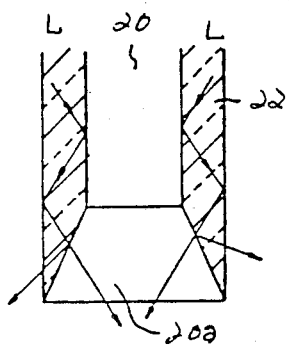
Figure 3B:
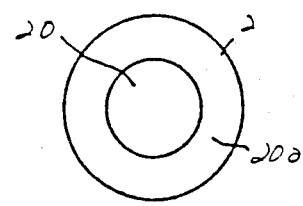
Figure 4A:
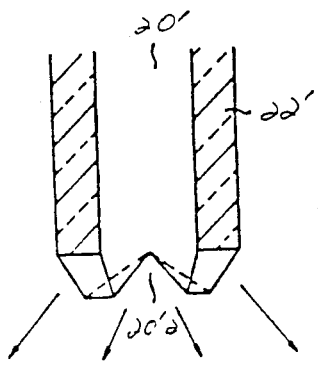
Figure 4B:
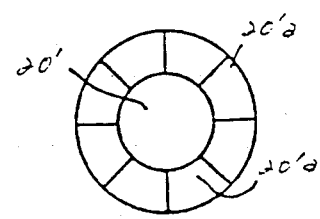

The principle described above is similarly applicable to a light conducting element in the form of a pipe. In FIGS. 3A and 3B, a light conducting pipe 20 comprises an annular wall 22 the light outlet end of which is cut aslant to define a radially outwardly flared opening 20a. In FIGS. 4A and 4B, a light conducting pipe 20' comprises an annular wall 22' the light outlet end of which is formed with a number of recesses or notches 20'a at spaced locations along the circumference of the pipe.

In the photoradiator shown in FIGS. 3A and 3B or FIGS. 4A and 4B, the converged light L such as sunlight propagates through the pipe wall 22 or 22' while being repeatedly reflected by the other peripheral surface thereof. The notch 20a or notches 20'a serve to effectively diffuse the light L to thereby radiate it to the ambience.

If desired, the embodiment shown in FIGS. 3A and 3B and that shown in FIGS. 4A and 4B may be combined, that is, the light outlet end of a light conducting pipe may be cut to have a flared opening and formed with a number of recesses along the circumference thereof. Again, the light outlet end may be finished to serve as a light scattering surface and the illustrated notch configuration is only illustrative.

Figure 5:
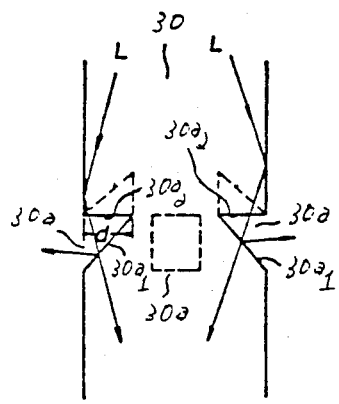
Figure 6:
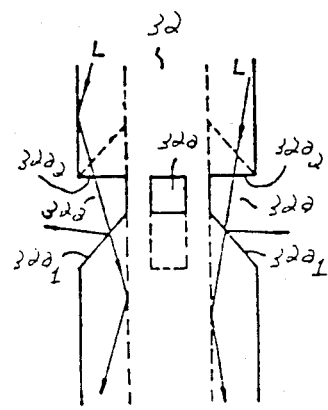

Referring to FIG. 5, another embodiment of the present invention is shown which is applied to a light conducting rod. The light conductor 30 in FIG. 5 is formed with a plurality of spaced notches 30a along the circumference thereof and in a selected position between axially opposite ends. Part of light L propagating through the rod 30 is partly diffused radially outwardly by the walls of the notches 30a. This type of circumferential notch arrangement is also applicable to a light conducting pipe, as shown in FIG. 6. The pipe 32 in FIG. 6 is formed with notches 32a at spaced locations along the circumference thereof and in a selected position between axially opposite ends. The photoradiator in FIG. 6 functions in the same manner as the photoradiator shown in FIG. 5, except that it reflects the light at both the inner and outer walls thereof.

In the photoradiator shown in FIGS. 5 or 6, a lower end wall $30a_1$ or $32a_1$ of each notch may be inclined radially outwardly with its associated upper end wall $30a_2$ or $32a_2$ formed perpendicular to the direction of light propagation as illustrated (to the axis of the light conductor 30 or 32). Alternatively, the upper end wall $30a_2$ or $32a_2$ may be oriented substantially parallel to the inclined lower end wall, as indicated by a phantom line in the drawing. Such a set of notches may be located at a number of spaced locations along the direction of light propagation, or the axis of the light conductor. In this case, the radial depth d of the notches may be sequentially increased in the direction of light propagation in order to set up substantially uniform radiation of light along the axis of the light conductor.

Referring to FIG. 7, another embodiment of the present invention is shown which has a plurality of light conducting rods (34-38 in the drawing) interconnected end-to-end in the illustrated order along the direction of light propagation. As shown, the rod 36 is formed with notches 36a so that the inclined walls $36a_1$ thereof may effectively diffuse light coming out from the bottom of the rod 34. Likewise, the rod 38 below the rod 36 is formed with notches 38a to diffuse light at the inclined walls $38a_1$ thereof. Such a serial interconnection scheme is applicable to light conducting pipes as well. As shown in FIG. 8, pipes 40-44 are interconnected sequentially along the direction of light propagation. The pipe 42 has notches 42a with inclined walls $42a_1$ and the pipe 44, notches 44a with inclined walls $44a_1$.

It will be seen that the diffusion of light attainable with the photoradiator shown in FIG. 7 or 8 is as effective as that attainable with the photoradiator of FIGS. 5 or 6. Nevertheless, the photoradiator of FIGS. 7 or 8 is distinguishable over the photoradiator of FIGS. 5 or 6 by the easier and more accurate production due to the serial connection of a plurality of light conducting elements which have been individually machined to have the notches.

A modification to the photoradiator of FIG. 8 is illustrated in FIG. 9. As shown, the pipe 40 is connected to the pipe 42 by a light conducting rod 46 whose refractive index is larger than that of the pipe 40. Likewise, the pipe 42 is connected to the pipe 44 by another light conducting rod 46. The photoradiator having such a construction attains efficient transmission of light, since the light transmitted through the bore of any pipe is introduced into the annular wall of the adjacent pipe by the rod 46; the pipe walls have a higher light transmission efficiency than air.

Figure 10:
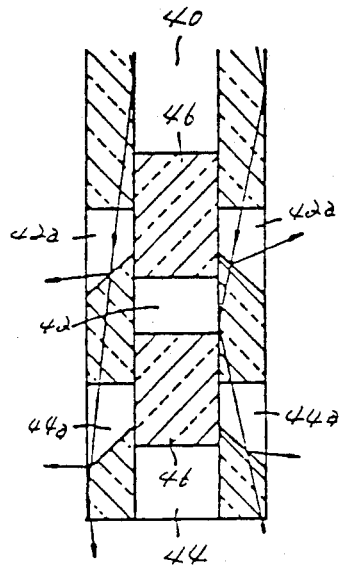

Referring to FIGS. 10-13, other embodiments of the present invention are shown which are commonly designed to diffuse light raidally outwardly to the ambience. In FIG. 10, the photoradiator comprises light conducting elements 50 and 52 which are connected end-to-end to each other. The end of the element 50 adjacent to the other element 52 comprises a flat surface 50a, while the end of the element 52 comprises a frustoconical inclined surface 52a which terminates at a flat top 52b. When the light conductors 50 and 52 are assembled together, light propagating through the light conductor 50 will be partly introduced into the following light conductor 52 and the rest is diffused effectively to the outside by refelection at the inclined surface 52a while being partly routed into the element 52.

In the photoradiator shown in FIG. 10, the inclination angle $8\theta$ of the inclined surface 52a is variable to steer the light in a desired direction out of the photoradiator. Where the angle $\theta$ is 45 degrees, for example, the light will be radiated perpendicular to the axis of the photoradiator if it is parallel light, and over a substantial radiation angle if it is converged light. Also, the ratio in area between the inclined surface 52a and the flat top 52b may be varied to set up any desired ratio between the quantity of light steered to the outside and the quantity of light transmitted to the subsequent light conductor.

Figure 11:
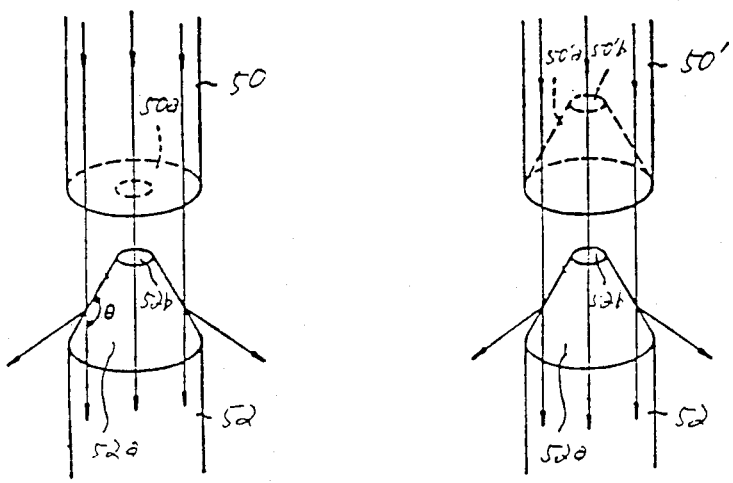

In FIG. 11, a light conducting element 50' is formed with a frustoconical recess 50'a and a flat surface 50'b which are generally complementary to the contiguous frustoconical surface 52a and flat surface 52b of the light conducting element 52, which is the same as the element 52 of FIG. 10. In this construction, light propagating through the element 50' is partly transmitted to the element 52 via the aligned flat surfaces 50'b and 52b, while the rest is partly refelected outwardly by the inclined surfaces 50'a and 52b and partly transmitted into the element 22. The photoradiator construction shown in FIG. 11 is advantageous in that it allows the two elements 50' and 52 to be aligned with ease to each other.

In FIG. 11, should the interconnecting surfaces of the rods 50' and 52 be configured fully complementary to each other, no light would be refelected by the inclined surfaces. It is preferable, therefore, to desposit a semitransparent layer on the inclined surface of either one of the rods 50' and 52. Generally, however, it will suffice to form them approximately complementary so that an air space may be defined therebetween to reflect part of the propagating light at the inclined surfaces.

Figure 12:
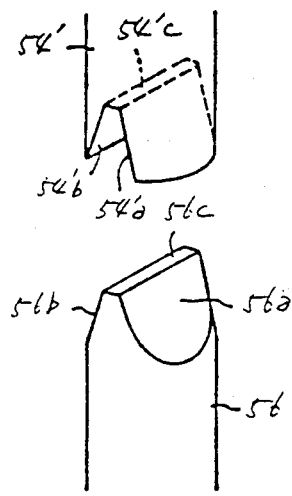
Figure 13:
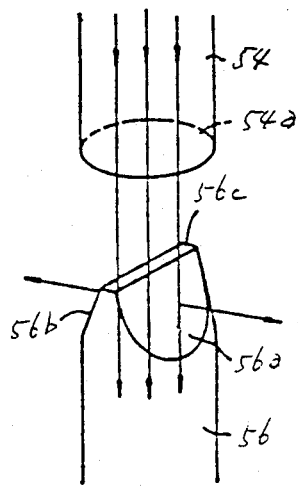
Figure 14:
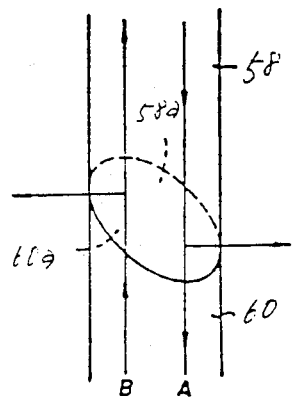

In FIG. 13, the photoradiator comprises a cylindrical light conducting element 54 having a flat end 54a, and a light conducting element 56 having two inclined surfaces 56a and 56b which converge to a flat top 56c. In this case, light transmitted through the light conductor 54 will be diffused outwardly in two directions by the inclined surfaces 56a and 56b. Again, the light conductor 54 may have its end formed complementary to that of the light conductor 56 as shown in FIG. 12. In FIG. 12, the element 54' has a recess defined by opposite inclined surfaces 54'a and 54'b and a flat surface 54'c. The construction shown in FIG. 12, like that shown in FIG. 11, will promote easy alignment between the two coactive light conductors 54' and 56.

While in the embodiment shown in FIG. 12 or 13 the opposite inclined surfaces 56a and 56b are assumed to be equal in area to each other, they may be provided with different areas such that a larger quantity of light is reflected by one of them than by the other. In the extreme case, the configuration may be such that the light is reflected by one inclined surface 60a of a light conducting element 60 as indicated by an arrow A. In this case, light may be supplied from the light conductor 60 into an upper light conductor 58 as indicated by an arrow B.

Referring to FIG. 15, another embodiment of the present invention is shown which is furnished with means for controlling a quantity of light radiation. The photoradiator in FIG. 15 comprises a first light conducting element 62, a second light conducting element 64 and a transparent control member 68. Either one of the elements 62 and 64 (64 in this particular embodiment) is formed with a recess 64a at an end thereof which connects to the other element. The transparent control member 68 is removably disposed in the recess 64a. As shown, the control member 64 includes a flat surface 68a and an inclined surface 68b. In this photoradiator construction, light propagating through the light conductor 62 is partly transmitted to the light conductor 64 via the flat surface 68a of the control member 68 and the rest is partly reflected outwardly by the inclined surface 68b while being partly routed into the light conductor 64.

A characteristic feature of the photoradiator shown in FIG. 15 is that the quantity of light steered by the inclined surface 68b of the control member 68 is adjustable by controlling the position of the control member 68 in the recess 64a. Light from the light conductor 62 will be partly reflected by the inclined surface 68b of the control member 68 as indicated by an arrow A, while light from the light conductor 64 will be reflected by the inclined surface 86b as indicated by an arrow B. Therefore, light may be supplied in either one of the opposite directions as desired.

Another example of the transparent control member is shown in FIG. 16. As shown, the alternative transparent control member 70 comprises two inclined surfaces $70a_1$ and $70a_2$ which reflect light from the light conductor 62 (FIG. 15) in two different directions, as indicated by arrows A. The position of such a control member is adjustable in the recess 64a (FIG. 15) to vary the proportions of the light reflected by the opposite inclined surfaces $70a_1$ and $70a_2$ to each other. Again, only one inclined surface may be formed on the member 70 in the extreme case. The control member 70, different from the control member 68 of FIG. 15, is incapable of reflecting light coming in from the light conductor 64 (FIG. 15), since it would reflect it back thereinto at the inclined surfaces $70a_1$ and $70a_2$ as indicated by arrows B.

It will be apparent that a number of interconnection surfaces each including an inclined surface or surfaces as described may be defined sequentially along the axis of the photoradiator. In such a case, the control member 70 shown in FIG. 16 may be installed in the photoradiator in the position shown in FIG. 17 to return light reached the last light conductor n, thereby causing more effective radiation of light. It is necessary then to treat a flat surface 70b between the inclined surfaces $70a_1$ and $70a_2$ to reflect incident light.

Figure 18:
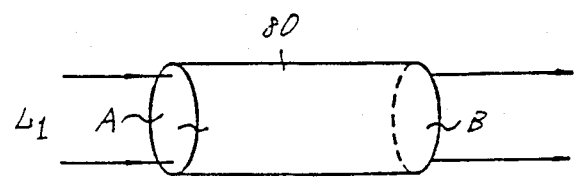
FIGS. 18 and 19 are views of a prior art simple cylindrical light conducting element.
Figure 19:
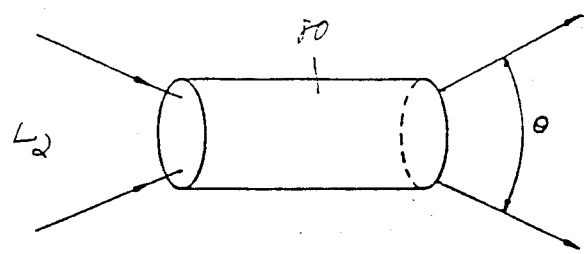

Now, assume a simple cylindrical light conducting element 80 as shown in FIGS. 18 and 19. When parallel light $L_1$ is introduced into one end A of the light conductor 80 as shown in FIG. 18, it will be radiated from the other end B without any divergence. When the incident light is converged light as indicated by $L_2$ in FIG. 19, it will be radiated over a divergence angle $\theta$ of about 46 degrees. However, such a simple cylindrical light conductor suffers from the drawbacks previously discussed. Farther embodiments of the present invention will be describe which are elaborated to radiate light after varying its optical property to suit a desired application.

Figure 20A:
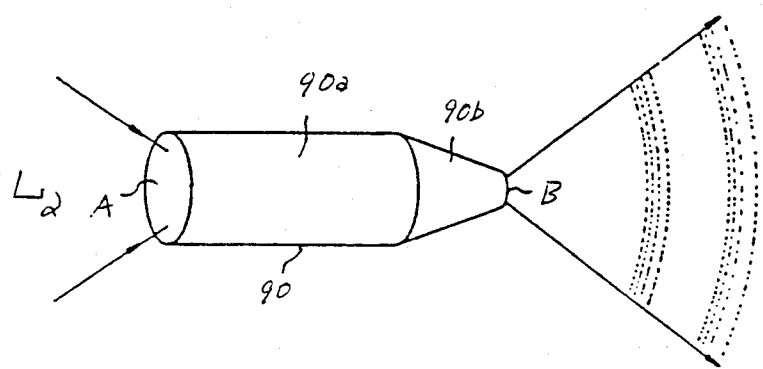
Figure 20B:
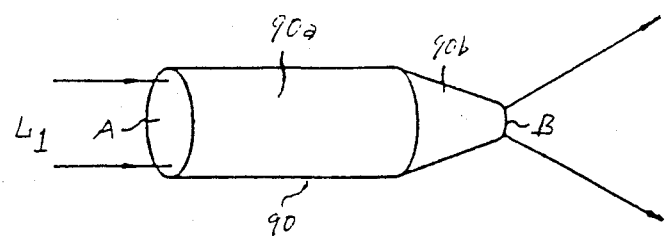

Referring to FIGS. 20A and 20B, the photoradiator comprises a light conducting element 90 which is made up of a cylindrical portion 90a and a frustoconical portion 90b which extends tapered from the cylindrical portion 90a. When converged light $L_2$ is incident on an end A of the cylindrical portion 90a, it will propagate through the light conductor 90 while being reflected by the wall of the continuous portions 90a and 90b. The light output from an end B of the frustoconical portion 90b has a substantial divergence angle due to the N.A which has increased during the travel of the light through the frustoconical portion 90b. Fringes which develop in the light output from the photoradiator 90 will be feasible to special decorative applications. For more general lighting applications, parallel light $L_1$ may be introduced into the light conductor 90 as shown in FIG. 20B. The light outgoing the light conductor shown in FIG. 20B is substantially identical in optical property with the incoming light.

Figure 21A:
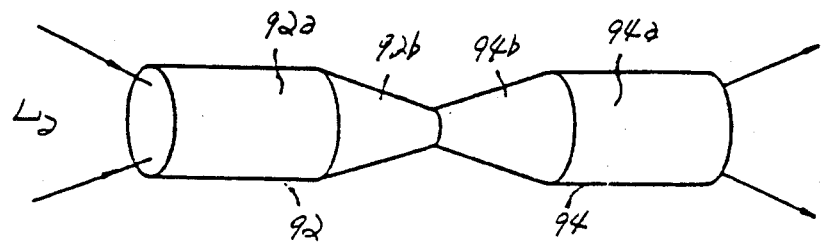
Figure 21B:
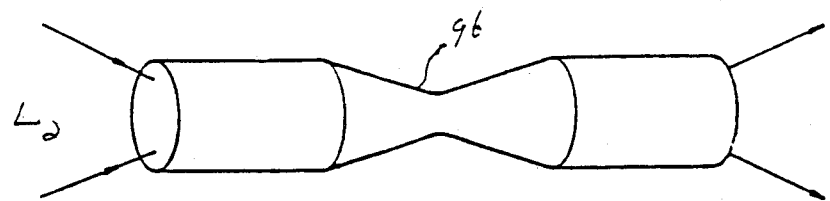

Referring to FIG. 21A, the photoradiator comprises a light conducting element 92 having a cylindrical portion 92a and a frustoconical portion 92b, and a second light conducting element 94 having a cylindrical portion 94a and a frustoconical portion 94b. The light conductors 92 and 94 are interconnected at the ends of their frustoconical portions 92b and 94b as illustrated. This type of construction eliminates fringes in the light radiated from the photoradiator, since the fringes developed in the light conductor 92 is cancelled in the second light conductor 94. If desired, use may be made of a single piece light conductor 96 as shown in FIG. 21B, which is identical in configuration with the interconnected light conductors 92 and 94.

Figure 22A:
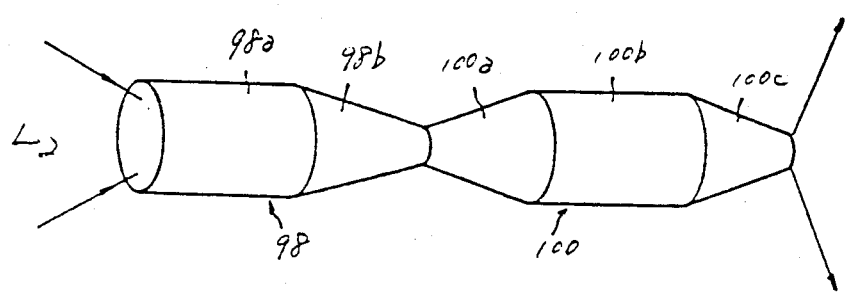
Figure 22B:
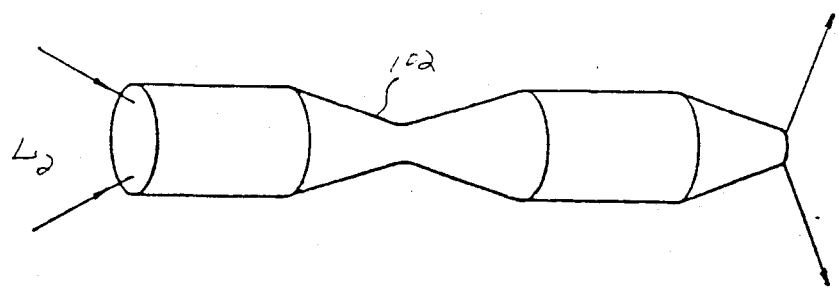

Another embodiment of the present invention is shown in FIG. 22A which comprises a light conducting element 98 having a cylindrical portion 98a and a frustoconical portion 98b contiguous with the cylindrical portion 98a, and a second light conducting element 100 having a frustoconical portion 100a, a cylindrical portion 100b and a frustoconical portion 100c. This is similar to the construction shown in FIG. 21A except for the additional conical portion 100c which, as in the construction of FIG. 20A, serves to increase the radiation angle of output light by reflection. Again, the two light conductors 98 and 100 may be replaced with a single light conductor 102 configured generally identical thereto.

Various modifications will become possible for those skilled in the art after receiving the teachings of the present disclosure without departing from the scope thereof.

What is claimed is:

1. A photoradiator for diffusing light transmitted therethrough comprising a first and second cylindrical light conducting rods each having a longitudinal axis and each having an outer cylindrical wall, said first cylindrical light conducting rod having a first lognitudinal end section, said first longitudinal end section having an inner frusto-conical wall and an inner flat end wall, said inner frusto-conical wall having a large diameter end and a small diameter end, said large diameter end being coincident with a circumferential line on said outer cylindrical wall of said first cylidrical light conduting rod, said inner flat end wall having a circular configuration, said smaller diameter end of said inner frusto-conical wall beng coincident with said inner flat circular end wall, said second cylindrical light conducting rod having a second longitudinal end sections said second longitudinal end section having an outer frusto-conical wall and an outer flat end wall, said outer rustoconical wall having a large diameter end and a small diameter end, the last said large diameter end being coincident with a circumferential line on said outer cylindrical wall of said second cylindrical light conducting rod, said outer flat end wall having a circular configuration, said small diameter end of said outer frusto-conical wall being coincident with said outer flat circular end wall, said inner frusto-conical wall, along with said inner flat circular end wall, being complementarily arranged and axially aligned respectively with said outer frusto-conical wall along with said outer flat circular end wall; and a semitransparent layer deposited on either one of said inner frusto-conical wall of said first cylindrical light conducting rod and said outer frusto-conical wall of said second cylindrical light conducting rod, whereby light propagating through said first cylindrical light conducting rod is transmitted to said second cylindrical light conducting rod via said inner and outer flat circular end walls while the rest of the light being propagated is partly reflected laterally outwardly by said inner and outer frusto-conical wall via said semitransparent layer and partly transmitted through said inner and outer frusto-conical walls and said semitransparent layer into said second cylindrical light conducting rod.

2. A photoradiator for diffusing light transmitted therethrough comprising first and second cylindrial light conducting rods each having a longitudinal axis and each having an outer cylindrical wall, said first cylindrical light conducting rod having a first longitudinal end section, said first longitudinal end section having an inner frusto-conical wall and an inner flat end wall, said inner frusto-conical wall having a large diameter end and a small diameter end, said large diameter end being coincident with a circumferential line on said outer cylindrical wall of said first cylindrical light conducting rod, said inner flat end wall having a circular configuration, said small diameter end of said inner frusto-conical wall being coincident with said inner flat circular end wall, said second cylindrical light conducting rod having a second longitudinal end section, said second longitudinal end section having an outer frusto-conical wall and an outer flat end wall, said outer frusto-conical wall having a large diameter end and a small diameter end, the last said large diameter end being coincident with a circumferential line on said outer cylindrical wall of said second cylindrical light conducting rod, said outer flat end wall having a circular configuration, said small diameter end of said outer frusto-conical wall being coincident with said outer flat circular end wall, said inner frusto-conical wall being fully complementary with said outer frusto-conical wall, and a semitransparent layer deposited on either one of said inner frusto-conical walls of said first cylindrical light conducting rod and said outer frusto-conical wall of said second cylindrical light conducting rod, said first and second cylindrical light conducting rods being disposed in an axially aligned position with said inner frusto-conical wall being separated from said outer frusto-conical wall by said semitransparent layer and with both said inner and outer frusto-conical walls in contact with said semitransparent layer, whereby light propagating through said first cylndrical light conducting rod is transmitted to said second cylindrical light conducting rod via said inner and outer flat circular end walls while the rest of the light being propagated is partly reflected laterally outwardly by said inner and outer frusto-conical wall via said semitransparent layer and partly transmitted through said inner and outer frusto-conical walls and said semitransparent layer into said second cylindrical light conducting rod.

3. A photradiator for diffusing light transmitted therethrough comprising first and second cylindrical light conducting rods each having a longitudinal axis and each having an outer cylindrical wall, said first cylindrical light conducting rod having a first longitudinal end section, said first longitudinal end section having an inner frusto-conical wall and an inner flat end wall, said inner frusto-conical wall having a large diameter end and a small diameter end, said large diameter end being coincident with a circumferential line on said outer cylindrical wall of said first cylindrical light conducting rod, said inner flat end wall having a circular configuration, said small diameter end of said inner frusto-conical wall being coincident with said inner flat circular end wall, said second cylindrical light conducting rod having a second longitudinal end section, said second longitudinal end section having an outer frusto- conical wall and an outer flat end wall, said outer frusto-conical wall having a large diameter end and a small diameter end, the last said large diameter end being coincident with a circumferential line on said outer cylindrical wall of said second cylindrical light conducting rod, said outer flat end wall having a circular configuration, said small diameter end of said outer frusto-conical wall being coincident with said outer flat circular end wall, said first and second cylindrical light conducting rods being disposed in an axially aligned position with an air space between said inner frusto-conical wall and said outer frusto-conical wall, whereby light propagating through said first cylindrical light conducting rod is transmitted to said second cylindrical light conducting rod via said inner and outer flat circular end walls while the rest of the light being propagated is partly reflected laterally outwardly by said inner and outer frusto-conical wall via said air space and partly transmitted through said inner and outer frusto-conical walls and said air space into said second cylindrical light conducting rod.

* * * * *